United States Patent
Fluga et al.

(10) Patent No.: US 7,278,411 B1
(45) Date of Patent: Oct. 9, 2007

(54) FLOW SENSOR

(75) Inventors: Eric C. Fluga, Dunlap, IL (US); Patrick W. Savage, Jr., Chillicothe, IL (US); James R. Weber, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/398,938

(22) Filed: Apr. 6, 2006

(51) Int. Cl.
*F02B 47/08* (2006.01)
*F02M 25/07* (2006.01)

(52) U.S. Cl. .................................. 123/568.12

(58) Field of Classification Search ........... 123/568.12, 123/568.11, 568.16, 568.22, 568.31, 573; 60/605.2, 611, 612, 599
See application file for complete search history.

(56) References Cited

U.S. PATENT DOCUMENTS

| | | | | |
|---|---|---|---|---|
| 3,355,877 A * | 12/1967 | Chaffiotte | .................... | 60/599 |
| 6,347,519 B1 * | 2/2002 | Kreso | .......................... | 60/602 |
| 6,378,508 B1 * | 4/2002 | Braun et al. | ........... | 123/568.12 |
| 6,588,210 B2 * | 7/2003 | Kreso | .......................... | 60/602 |
| 6,658,345 B2 * | 12/2003 | Miller | ........................ | 701/108 |
| 6,725,847 B2 * | 4/2004 | Brunemann et al. | ... | 123/568.12 |
| 6,786,210 B2 | 9/2004 | Kennedy et al. | | |
| 6,804,601 B2 * | 10/2004 | Wang et al. | ................ | 701/107 |
| 6,912,895 B1 * | 7/2005 | Jaeger | ........................ | 73/118.1 |
| 2003/0101724 A1 * | 6/2003 | Zurawski et al. | .......... | 60/605.2 |
| 2006/0162333 A1 * | 7/2006 | Isogai | ........................ | 60/601 |

\* cited by examiner

*Primary Examiner*—Mahmoud Gimie
(74) *Attorney, Agent, or Firm*—Finnegan, Henderson, Farabow, Garrett & Dunn

(57) ABSTRACT

An exhaust system for receiving exhaust gas of an engine is provided. The exhaust system comprises a cooler configured to cool at least a portion of exhaust gas, a pressure sensor configured to measure an exhaust pressure drop across the cooler, and a controller configured to determine exhaust flowrate as a function the measured pressure drop across the cooler. Also provided is a method for operating an engine. The method comprises the steps of combusting a fuel and air mixture, exhausting at least some of the combusted fuel and air mixture as exhaust gas to an exhaust system of an engine, cooling at least some of the combusted exhaust gas in a cooler, measuring pressure drop of the exhaust gas across the cooler, and determining a flowrate of the exhaust gas across the cooler as a function of pressure drop.

35 Claims, 2 Drawing Sheets

FLOW SENSOR

TECHNICAL FIELD

The present disclosure relates generally to a flow sensor and, more particularly, to a flow sensor within the recirculated exhaust stream of an engine.

BACKGROUND

Internal combustion engines, including diesel engines, gasoline engines, natural gas engines, and other engines known in the art, may exhaust a complex mixture of chemical compounds. The chemical compounds may be composed of gaseous compounds, which may include nitrous oxides ("NOx"), and solid particulate matter, which may include unburned carbon particulates called soot.

Due to increased attention on the environment, exhaust emission standards have become more stringent, and the amount of gaseous compounds emitted to the atmosphere from an engine may be regulated depending on the type of engine, size of engine, and/or class of engine. One method that has been implemented by engine manufacturers to comply with the regulation of these engine emissions is exhaust gas recirculation ("EGR"). EGR systems recirculate some of the exhaust gas byproducts into the intake air supply of the internal combustion engine. The exhaust gas directed to the engine cylinder reduces the concentration of oxygen within the cylinder and increases the specific heat of the air/fuel mixture, thereby lowering the local combustion temperature within the cylinder. The lowered local combustion temperature and reduced oxygen concentration can slow the chemical reaction of the combustion process and decrease the formation of NOx.

Maintaining the proper ratio of EGR to intake air is important in lowering local combustion temperatures and, consequently, NOx formation. As such, a reliable and accurate EGR flow meter, in conjunction with other engine components, helps achieve stringent NOx emission limitations.

Some engines with external EGR loops, such as the one disclosed in U.S. Pat. No. 6,786,210 ("210"), have separate EGR meters for measuring EGR flow. '210 discloses a venturi measurement sensor for measuring flow disposed within the EGR passage. The presence of a separate airflow sensor within the airflow loop, as disclosed in '210, unfortunately, results in extra hardware to the EGR loop. The extra hardware may lead to increased costs and pressure loss. Furthermore, many engines are constrained by tight space limitations, as there may be limited space available "under the hood" of an automobile. In some of these engines, the extra hardware may present problems in meeting these space limitations.

The disclosed flow meter is directed to overcoming one or more of the problems set forth above.

SUMMARY OF THE INVENTION

In one embodiment of the present disclosure, an exhaust system for receiving exhaust gas of an engine is provided. In this embodiment, the system comprises a cooler configured to cool at least a portion of exhaust gas, a pressure sensor configured to measure an exhaust pressure drop across the cooler, and a controller configured to determine exhaust flowrate as a function the measured pressure drop across the cooler.

In another embodiment, a method for operating an engine is provided. In this embodiment, the method comprises the steps of combusting a fuel and air mixture, exhausting at least some of the combusted fuel and air mixture as exhaust gas to an exhaust system of an engine, cooling at least some of the combusted exhaust gas in a cooler, measuring pressure drop of the exhaust gas across the cooler, and determining a flowrate of the exhaust gas across the cooler as a function of pressure drop.

DETAILED DESCRIPTION

Figure 1:
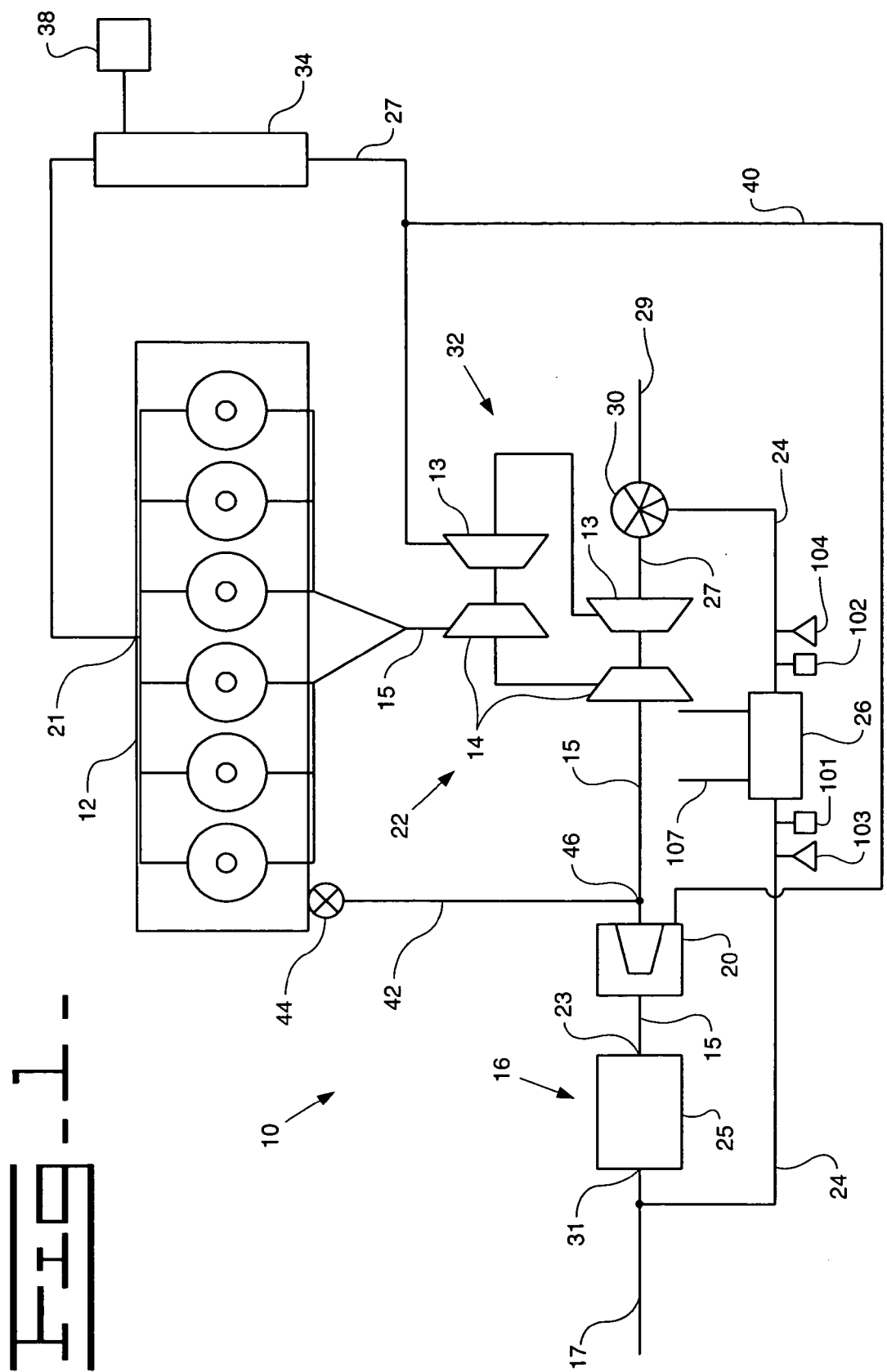
FIG. 1 is a diagrammatic illustration of an engine having an exhaust treatment system according to an exemplary embodiment of the present disclosure.

FIG. 1 illustrates a power source 12 having an exemplary exhaust treatment system 10. The power source 12 may include an internal or external combustion engine such as, for example, a diesel engine, a gasoline engine, a natural gas engine, or any other engine apparent to one skilled in the art. The power source 12 may, alternately, include another source of power known in the art.

The exhaust treatment system 10 may be configured to direct exhaust gases out of the power source 12, treat the gases, and introduce a portion of the treated gases into an intake 21 of the power source 12. The exhaust treatment system 10 may include an energy extraction assembly 22, a regeneration device 20, a filter 16 (which may be catalyzed), a recirculation line 24 fluidly connected between the filter 16 and the exhaust system outlet 17, and a flow cooler 26. The exhaust treatment system 10 may further include a mixing valve 30, a compression assembly 32, and an aftercooler 34.

A flow of exhaust produced by the power source 12 may be directed from the power source 12 to components of the exhaust treatment system 10 by flow lines 15. The flow lines 15 may include pipes, tubing, and/or other exhaust flow carrying means known in the art. The flow lines 15 may be made of alloys of steel, aluminum, and/or other materials known in the art. The flow lines 15 may be rigid or flexible, and may be capable of safely carrying high temperature exhaust flows, such as flows having temperatures in excess of 700 degrees Celsius (approximately 1,292 degrees Fahrenheit).

The energy extraction assembly 22 may be configured to extract energy from, and reduce the pressure of, the exhaust gases produced by the power source 12. The energy extraction assembly 22 may be fluidly connected to the power source 12 by one or more flow lines 15 and may reduce the pressure of the exhaust gases to any desired pressure. The energy extraction assembly 22 may include one or more turbines 14, diffusers, or other energy extraction devices known in the art. In an exemplary embodiment wherein the energy extraction assembly 22 includes more than one turbine 14, the multiple turbines 14 may be disposed in parallel or in series relationship. It is also understood that in an embodiment of the present disclosure, the energy extraction assembly 22 may, alternately, be omitted. In such an embodiment, the power source 12 may include, for example, a naturally aspirated engine. As will be described in greater detail below, a component of the energy extraction assembly 22 may be configured in certain embodiments to drive a component of the compression assembly 32.

In an exemplary embodiment, the regeneration device 20 may be fluidly connected to the energy extraction assembly 22 via flow line 15, and may be configured to increase the temperature of an entire flow of exhaust produced by the power source 12 to a desired temperature. The desired temperature may be, for example, a regeneration temperature of the filter 16. Accordingly, the regeneration device 20 may be configured to assist in regenerating the filter 16. Alternatively, in another exemplary embodiment the regeneration device 20 may be configured to increase the temperature of only a portion of the entire flow of exhaust produced by the power source 12. The regeneration device 20 may include, for example, a fuel injector and an igniter (not shown), heat coils (not shown), fuel sprayed on a catalytic surface (not shown), and/or other heat sources known in the art. Such heat sources may be disposed within the regeneration device 20 and may be configured to assist in increasing the temperature of the flow of exhaust through convection, combustion, and/or other methods. In an exemplary embodiment in which the regeneration device 20 includes a fuel injector and an igniter, it is understood that the regeneration device 20 may receive a supply of a combustible substance and a supply of oxygen to facilitate combustion within the regeneration device 20. The combustible substance may be, for example, gasoline, diesel fuel, reformate, and/or any other combustible substance known in the art. The supply of oxygen may be provided in addition to the relatively low-pressure flow of exhaust gas directed to the regeneration device 20 through flow line 15. In an exemplary embodiment, the supply of oxygen may be carried by a flow of gas directed to the regeneration device 20 from downstream of the compression assembly 32 via a supply line 40. In such an embodiment, the flow of gas may include, for example, recirculated exhaust gas and ambient air. It is understood that, in an exemplary embodiment of the present disclosure, the supply line 40 may be fluidly connected to an outlet of the compression assembly 32. In an exemplary embodiment, the regeneration device 20 may be dimensioned and/or otherwise configured to be housed within an engine compartment or other compartment of a work machine (not shown) to which the power source 12 is attached. In such an embodiment, the regeneration device 20 may be desirably calibrated in conjunction with, for example, the filter 16, the energy extraction assembly 22, and/or the power source 12. Calibration of the regeneration device 20 may include, for example, among other things, adjusting the rate, angle, pressure, and/or atomization at which fuel is injected into the regeneration device 20, adjusting the flow rate of the oxygen supplied, adjusting the intensity and/or firing pattern of the igniter, and adjusting the length, diameter, mounting angle, and/or other configurations of a housing of the regeneration device 20. Such calibration may reduce the time required to regenerate the filter 16 and the amount of fuel or other combustible substances needed for regeneration. Either of these results may improve the overall efficiency of the exhaust treatment system 10. It is understood that the efficiency of the exhaust treatment system 10 described herein may be measured by a variety of factors including, among other things, the amount of fuel used for regeneration, the length of the regeneration period, and the amount (parts per million) of pollutants released to the atmosphere.

As shown in FIG. 1, the filter 16 may be connected downstream of the regeneration device 20. The filter 16 may have a housing 25 including an inlet 23 and an outlet 31. In an exemplary embodiment, the regeneration device 20 may be disposed outside of the housing 25 and may be fluidly connected to the inlet 23 of the housing 25. In another exemplary embodiment, the regeneration device 20 may be disposed within the housing 25 of the filter 16. The filter 16 may be any type of filter known in the art capable of extracting matter from a flow of gas. In an embodiment of the present disclosure, the filter 16 may be, for example, a particulate matter filter positioned to extract particulates from an exhaust flow of the power source 12. The filter 16 may include, for example, a ceramic substrate, a metallic mesh, foam, or any other material known in the art. These materials may form, for example, a honeycomb structure within the housing 25 of the filter 16 to facilitate the removal of particulates. The particulates may be, for example, soot.

Although the above disclosure goes into great detail to explain an engine with an aftertreatment system, the reader should appreciate that the flow sensor of the present disclosure may be applied to several different applications, including engines without an aftertreatment system.

In an exemplary embodiment of the present disclosure, a portion of the exhaust produced by the combustion process may leak past piston rings within a crankcase (not shown) of the power source 12. This portion of the exhaust may build up within the crankcase over time, thereby increasing the pressure within the crankcase. In such an embodiment, a ventilation line 42 may be fluidly connected to the crankcase of the power source 12. The ventilation line 42 may comprise piping, tubing, and/or other exhaust flow carrying means known in the art and may be structurally similar to the flow lines 15 described above. The ventilation line 42 may be configured to direct, for example, the portion of exhaust gas from the crankcase to a port 46 of the flow line 15. The port 46 may be located in the flow line 15 anywhere upstream of the filter 16. For example, the ventilation line 42 may assist in directing the portion of exhaust gas from the crankcase to a port 46 disposed upstream of the regeneration device 20. The ventilation line 42 may include, for example, a check valve 44 and/or any other valve assembly known in the art. The check valve 44 may be configured to assist in controllably regulating a flow of fluid through the ventilation line 42.

The exhaust treatment system 10 may further include a catalyst (not shown) disposed upstream or downstream of the filter 16. The catalyst may contain catalyst materials for catalyzing hydrocarbons, oxides of sulfur, and/or oxides of nitrogen, for example, contained in a flow. Such catalyst materials may include, for example, aluminum, platinum, palladium, rhodium, barium, cerium, and/or alkali metals, alkaline-earth metals, rare-earth metals, or combinations thereof. The catalyst materials may be situated within the catalyst so as to maximize the surface area available for the collection of, for example, hydrocarbons. The catalyst may include, for example, a ceramic substrate, a metallic mesh, foam, or any other porous material known in the art, and the catalyst materials may be located on, for example, a substrate of the catalyst.

As mentioned above, filter 16 of the exhaust treatment system 10 may include catalyst materials for catalyzing hydrocarbons, oxides of sulfur, and/or oxides of nitrogen contained in a flow. Such catalyst materials may include, for example, aluminum, platinum, palladium, rhodium, barium, cerium, and/or alkali metals, alkaline-earth metals, rare-earth metals, or combinations thereof. The catalyst materials may be situated within the filter 16 so as to maximize the surface area available for the collection of, for example, hydrocarbons.

The catalyst materials may be located on a substrate of the filter 16. The catalyst materials may be added to the filter 16 by any conventional means such as, for example, coating or spraying, and the substrate of the filter 16 may be partially or completely coated with the materials.

It is also understood that the catalyst materials described above may be capable of oxidizing hydrocarbons in certain conditions. Thus, in the embodiment shown in FIG. 1, all or a portion of the hydrocarbons contained within the exhaust flow may be permitted to travel back to the power source 12 without being oxidized by the catalyst materials. It is further understood that the presence of these catalyst materials may improve the overall emissions characteristics of the exhaust treatment system 10 by removing hydrocarbons from the treated exhaust flow.

Referring again to FIG. 1, the exhaust treatment system 10 may further include a recirculation line 24 fluidly connected downstream of the filter 16. The recirculation line 24 may be disposed between the filter 16 and the exhaust system outlet 17 and may be configured to assist in directing a portion of the exhaust flow from the filter 16 to the inlet 21 of the power source 12. The recirculation line 24 may comprise piping, tubing, and/or other exhaust flow carrying means known in the art and may be structurally similar to the flow lines 15 described above.

A flow cooler 26 is also provided. The flow cooler 26 may be fluidly connected to the filter 16 via the recirculation line 24 and may be configured to cool the portion of the exhaust flow passing through the recirculation line 24. The flow cooler 26 may include a liquid-to-air heat exchanger, an air-to-air heat exchanger, or any other type of heat exchanger known in the art for cooling an exhaust flow. The cooler 26 may be a cross-flow, counter-flow, or parallel-flow heat exchanger, as well. In an exemplary embodiment, flow cooler 26 is a parallel-flow heat exchanger that uses jacket water from the power source's 12 cooling system as a cooling medium.

Figure 2:
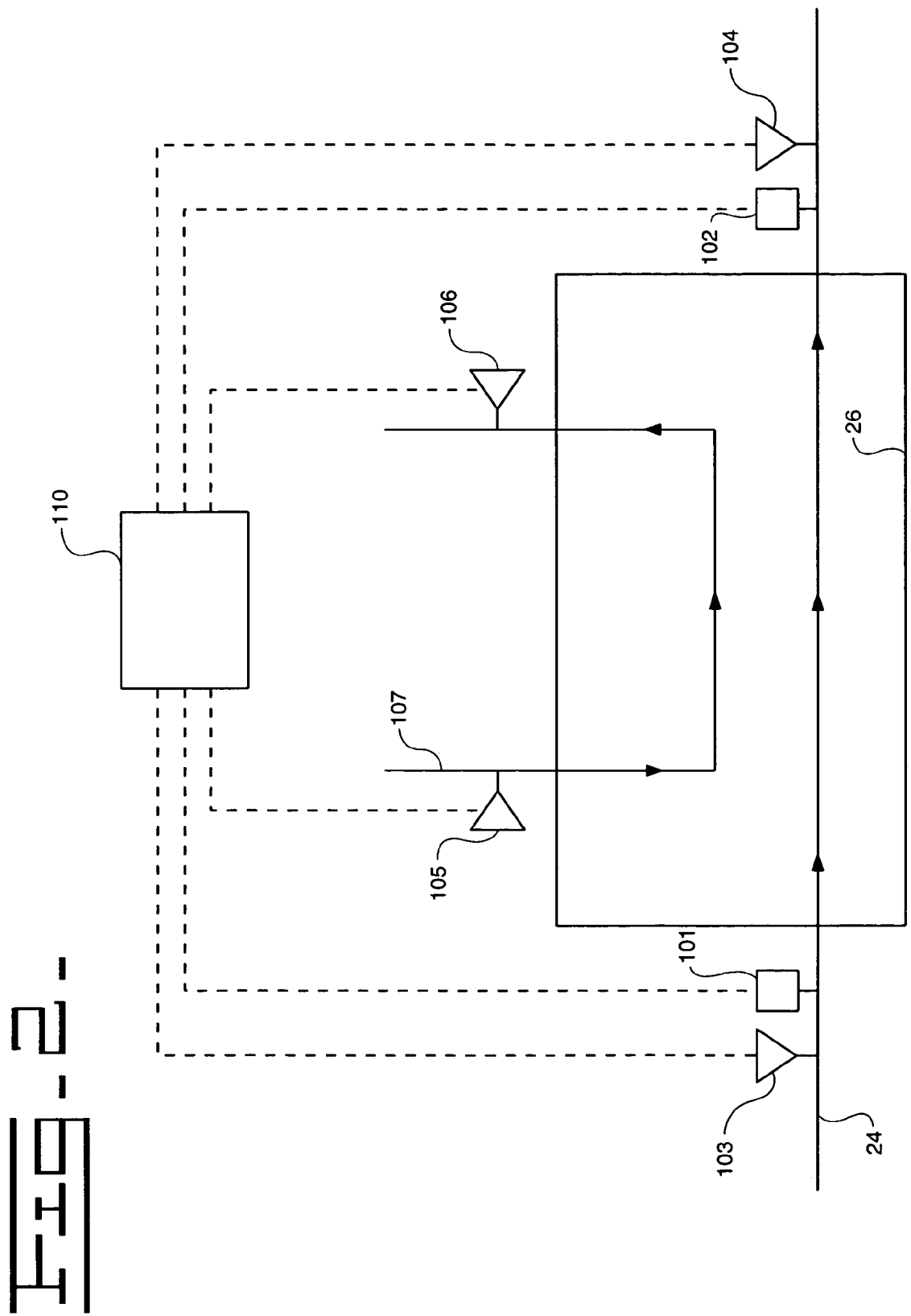
FIG. 2 is a cross-sectional view of a cooler shown in the embodiment of FIG. 1.

Referring to FIG. 2, positioned near cooler 26 may be temperature sensors 103, 104 and pressure sensors 101, 102 used for determining exhaust gas flowrate through recirculation line 24. Sensors 101, 102, 103, 104 generate pressure and temperature signals upstream and downstream of cooler 26 and sends them to controller 110. Controller 110 uses some or all of these sensors 101, 102, 103, 104 to determine an approximate flowrate through line 24. Controller 110 may calculate the flowrate, may refer to a map, or may use any other means known in the art for determining flowrate. Generally, flowrate through line 24 can be determined based upon the pressure drop across cooler 26. Furthermore, temperature signals 103, 104 may also be used to provide a more accurate flowrate signal, as the flowrate is a function of both the pressure drop across the cooler and temperature of the fluid to be cooled.

In some embodiments, the system may also include temperature sensors 105, 106. These sensors 105, 106 provide for temperature measurement of the cooling fluid in line 107. Over time, fouling of the heat transfer surfaces within cooler 26 may result in an increased pressure drop across cooler 26, for the same flowrate of fluid through line 24. This pressure drop may be the result of combustion byproducts clogging the fluid pipes through cooler 26. Accordingly, it may be necessary to compensate for this fouling-induced pressure drop by determining the effectiveness of the heat transfer surfaces within cooler 26. This can be accomplished by measuring the temperature drop of the cooling fluid in cooling line 107 across cooler 26. Over time, as the heat transfer surfaces become fouled—and less effective—the temperature drop across cooling line 107 will decrease. By monitoring the temperature drop in line 107, the level of fouling across cooler 26 can be approximated, thus providing for pressure drop compensation as a result of fouled heat transfer surfaces.

Referring back to FIG. 1, the mixing valve 30 may be fluidly connected to the flow cooler 26 via the recirculation line 24 and may be configured to assist in regulating the flow of exhaust through the recirculation line 24. It is understood that in an exemplary embodiment, a check valve (not shown) may be fluidly connected upstream of the flow cooler 26 to further assist in regulating the flow of exhaust through the recirculation line 24. The mixing valve 30 may be a spool valve, a shutter valve, a butterfly valve, a gate valve, a shuttle valve, a ball valve, a globe valve, or a check valve, for example. The mixing valve 30 may be actuated manually, electrically, hydraulically, pneumatically, or in any other manner known in the art. The mixing valve 30 may be in communication with a controller 110 and may be selectively actuated in response to one or more predetermined conditions.

The mixing valve 30 may also be fluidly connected to an ambient air intake 29 of the exhaust treatment system 10. Thus, the mixing valve 30 may be configured to control the amount of exhaust flow entering a flow line 27 relative to the amount of ambient airflow entering the flow line 27. For example, as the amount of exhaust flow passing through the mixing valve 30 is desirably increased, the amount of ambient air flow passing through the mixing valve 30 may be proportionally decreased and vise versa.

The flow line 27 downstream of the mixing valve 30 may direct the ambient air/exhaust flow mixture to the compression assembly 32. The compression assembly 32 may include a compressor 13 configured to increase the pressure of a flow of gas a desired pressure. The compressor 13 may include a fixed geometry type compressor, a variable geometry type compressor, or any other type of compressor known in the art. In the exemplary embodiment shown in FIG. 1, the compression assembly 32 may include more than one compressor 13 and the multiple compressors 13 may be disposed in parallel or in series relationship. A compressor 13 of the compression assembly 32 may be connected to a turbine 14 of the energy extraction assembly 22 and the turbine 14 may be configured to drive the compressor 13. In particular, as hot exhaust gases exit the power source 12 and expand against the blades (not shown) of the turbine 14, components of the turbine 14 may rotate and drive the connected compressor 13. Alternatively, in an embodiment in which the turbine 14 is omitted, the compressor 13 may be driven by, for example, the power source 12, or by any other drive known in the art. It is also understood that in a non-pressurized air induction system, the compression assembly 32 may be omitted.

The aftercooler 34 may be fluidly connected to the power source 12 via the flow line 27 and may be configured to cool a flow of gas passing through the flow line 27. In an exemplary embodiment, this flow of gas may be the ambient air/exhaust flow mixture discussed above. The aftercooler 34 may include a liquid-to-air heat exchanger, an air-to air heat exchanger, or any other type of flow cooler or heat exchanger known in the art. In an exemplary embodiment of the present disclosure, the aftercooler 34 may be omitted if desired.

The exhaust treatment system 10 may further include a condensate drain 38 fluidly connected to the aftercooler 34. The condensate drain 38 may be configured to collect a fluid, such as, for example, water or other condensate formed at the aftercooler 34. It is understood that such fluids may consist of, for example, condensed water vapor contained in recycled exhaust gas and/or ambient air. In such an exemplary embodiment, the condensate drain 38 may include a removably attachable fluid tank (not shown) capable of safely storing the condensed fluid. The fluid tank may be configured to be removed, safely emptied, and reconnected to the condensate drain 38. In another exemplary embodiment, the condensate drain 38 may be configured to direct the condensed fluid to a fluid container (not shown) and/or other component or location on the work machine. Alternatively, the condensate drain 38 may be configured to direct the fluid to the atmosphere or to the surface by which the work machine is supported.

INDUSTRIAL APPLICABILITY

The exhaust treatment system 10 of the present disclosure may be used with any combustion-type device such as, for example, an engine or any other device known in the art where the recirculation of exhaust into an inlet of the device is desired. The exhaust treatment system 10 may be useful in reducing the amount of regulated exhaust emissions discharged to the environment and reducing or substantially eliminating the amount of sulfate produced during treatment of the exhaust gas. The exhaust treatment system 10 may also be capable of purging the portions of the exhaust gas captured by components of the system through a regeneration process.

As discussed above, the combustion process may produce a complex mixture of chemical compounds. These chemical compounds may exist in solid, liquid, and/or gaseous form. In general, the solid and liquid pollutants may fall into the three categories of soot, soluble organic fraction, and sulfates. The soot produced during combustion may include carbonaceous materials, and the soluble organic fraction may include unburned hydrocarbons that are deposited on or otherwise chemically combined with the soot. The sulfates produced in the combustion process may be formed from sulfur molecules contained within the fuel and may be released in the form of $SO_2$. This $SO_2$ may react with oxygen molecules contained within the exhaust flow to form $SO_3$. As explained above, $SO_2$ may also be converted into $SO_3$ in the presence of, for example, platinum, palladium, and/or other rare earth metals used as catalyst materials in conventional catalysts. It is understood that the combustion process may also produce small amounts of $SO_3$.

In a conventional exhaust treatment system, a portion of the $SO_3$ produced may be released to the atmosphere through an outlet of the exhaust system. The exhaust treatment system 10 of the present disclosure, however, may substantially reduce the formation of sulfates by minimizing the amount of platinum, palladium, and/or other precious earth metals used. The operation of the exhaust treatment system 10 will now be explained in detail. Unless otherwise noted, the exhaust treatment system 10 of FIG. 1 will be referred to for the duration of the disclosure.

The power source 12 may combust a mixture of fuel, recirculated exhaust gas, and ambient air to produce mechanical work and an exhaust flow containing the gaseous compounds discussed above. The exhaust flow may be directed, via flow line 15, from the power source 12 through the energy extraction assembly 22. The hot exhaust flow may expand on the blades of the turbines 14 of the energy extraction assembly 22, and this expansion may reduce the pressure of the exhaust flow while assisting in rotating the turbine blades.

The reduced pressure exhaust flow may pass through the regeneration device 20 to the filter 16. The regeneration device 20 may be deactivated during the normal operation of the power source 12. As the exhaust flow passes through the filter 16, a portion of the particulate matter entrained with the exhaust flow may be captured by the substrate, mesh, and/or other structures within the filter 16.

A portion of the exhaust flow may be extracted downstream of the filter 16 and upstream of the exhaust system outlet 17. The extracted portion of the exhaust flow may enter the recirculation line 24 and may be recirculated back to the power source 12. The remainder of the exhaust flow may exit the exhaust system outlet 17. The catalyst materials contained within the catalyst may assist in oxidizing the hydrocarbons and soluble organic fraction carried by the flow.

In the exemplary embodiment illustrated in FIG. 2, the filter 36 may contain small amounts of catalyst materials such as platinum. The catalyst materials may be disposed on a substrate of the filter 36 and may substantially oxidize the hydrocarbons and soluble organic fraction contained within the exhaust flow. Such a configuration may result in the production of substantially less sulfate in the recirculated filtered exhaust flow than conventional exhaust treatment systems containing a separate catalyst upstream of a filter.

Referring again to FIG. 1, the recirculated portion of the exhaust flow may pass through the flow cooler 26. The flow cooler 26 may reduce the temperature of the portion of the exhaust flow before the portion enters the flow line 27. The mixing valve 30 may be configured to regulate the ratio of recirculated exhaust flow to ambient inlet air passing through flow line 27. As described above, the calculated flow rate from recirculation line 24 may be used to establish the desired ratio.

The mixing valve 30 may permit the ambient air/exhaust flow mixture to pass to the compression assembly 32 where the compressors 13 may increase the pressure of the flow, thereby increasing the temperature of the flow. The compressed flow may pass through the flow line 27 to the aftercooler 34, which may reduce the temperature of the flow before the flow enters the inlet 21 of the power source 12.

Over time, soot produced by the combustion process may collect in the filter 16 and may begin to impair the ability of the filter 16 to store particulates or may result in an undesirable increase in pressure drop across the filter 16, which may lead to higher exhaust temperatures and increased fuel consumption. Pressure sensors 101, 102, temperature sensors 103, 104, 105, 106, and other sensors (not shown) sense parameters of the power source 12 and/or the exhaust treatment system 10. Such parameters may include, for example, engine speed, engine temperature, and particulate matter content. Controller 110 may use the information sent from the sensors in conjunction with an algorithm or other pre-set criteria to determine whether the filter 16 has become saturated and is in need of regeneration. Once this saturation point has been reached, the controller 110 may send appropriate signals to components of the exhaust treatment system 10 to begin the regeneration process. A preset algorithm stored in the controller 110 may assist in this determination and may use the sensed parameters as inputs. Alternatively, regeneration may commence according to a set schedule based on fuel consumption, hours of operation, and/or other variables.

The signals sent by the controller 110 may alter the position of the mixing valve 30 to desirably alter the ratio of the ambient air/exhaust flow mixture. Some of these signals may be the exhaust gas flow pressure drop across the cooler 26, the temperature drop of the cooling medium in line 107 across cooler 26, and the temperature drop of the exhaust gas across cooler 26. As discussed earlier, measuring the pressure drop of the exhaust gas across cooler 26 along with measuring the temperature drop of both the cooling medium and exhaust gas across cooler 26 enables controller 110 to compensate for fouling of the heat transfer surfaces of cooler 26 in determining an accurate flowrate. This fouling-compensated flowrate measurement can then be used to send control signals to mixing valve 30, for example.

These signals may also activate the regeneration device 20. Upon activation, oxygen and a combustible substance, such as, for example, fuel may be directed to the regeneration device 20. The regeneration device 20 may ignite the fuel and may increase the temperature of the exhaust flow passing to the filter 16 to a desired temperature for regeneration. This temperature may be in excess of 700 degrees Celsius (approximately 1,292 degrees Fahrenheit) in some applications, depending on the type and size of the filter 16. At these temperatures, soot contained within the filter 16 may be burned away to restore the storage capabilities of the filter 16.

Other embodiments of the disclosed exhaust treatment system 10 will be apparent to those skilled in the art from consideration of the specification. For example, the system 10 may include additional filters such as, for example, a sulfur trap disposed upstream of the filter 16. The sulfur trap may be useful in capturing sulfur molecules carried by the exhaust flow. It is intended that the specification and examples be considered as exemplary only, with the true scope of the invention being indicated by the following claims.

What is claimed is:

1. An exhaust system for receiving exhaust gas of an engine, comprising:
   a cooler configured to cool at least a portion of exhaust gas;
   a pressure sensor configured to measure an exhaust pressure drop across the cooler;
   a controller configured to determine exhaust flowrate as a function of the measured pressure drop and a level of fouling of the cooler.

2. The exhaust system of claim 1, further comprising a recirculated exhaust gas loop configured to send the cooled portion of exhaust gas to an intake of an engine.

3. The exhaust system of claim 1, further comprising at least one temperature sensor configured to measure the temperature of the exhaust.

4. The exhaust system of claim 3, further comprising at least two temperature sensors configured to measure the temperature drop of the exhaust gas across the cooler.

5. The exhaust system of claim 1, in which the cooler is a parallel-flow heat exchanger.

6. The exhaust system of claim 1, in which the cooler comprises a cooling medium for cooling the exhaust gas.

7. The exhaust system of claim 6, further comprising a first set of temperature sensors configured to measure the temperature drop of the cooling medium across the cooler.

8. The exhaust system of claim 7, further comprising a second set of temperature sensors configured to measure the temperature drop of the exhaust gas across the cooler.

9. The exhaust system of claim 8, in which the controller is configured to determine the level of fouling within the cooler as a function of the temperature drop of the cooling medium across the cooler, the temperature drop of the exhaust gas across the cooler, and the pressure drop of the exhaust gas across the cooler.

10. The exhaust system of claim 6, in which the cooler uses engine jacket water as the cooling medium.

11. The exhaust system of claim 1, in which the cooler is positioned in a recirculated exhaust gas loop of an engine and the controller is configured to determine recirculated exhaust gas flowrate.

12. An engine, comprising:
   an intake air system;
   at least one combustion chamber; and
   the exhaust system of claim 1;
   in which the intake air system is configured to receive at least some exhaust gas from the exhaust system.

13. The exhaust system of claim 1, further comprising a regeneration device configured to increase the temperature of an entire flow of the exhaust gas to a desired temperature.

14. The exhaust system of claim 1, further comprising an energy extraction assembly configured to extract energy from, and reduce the pressure of, the exhaust gas.

15. The exhaust system of claim 1, further comprising cooling a flow of exhaust gas with an aftercooler.

16. A method for operating an engine, comprising the steps of:
   combusting a fuel and air mixture;
   exhausting at least some of the combusted fuel and air mixture as exhaust gas to an exhaust system of an engine;
   cooling at least some of the combusted exhaust gas in a cooler;
   measuring a level of fouling of the cooler;
   measuring pressure drop of the exhaust gas across the cooler; and
   determining a flowrate of the exhaust gas across the cooler as a function of pressure drop and the level of fouling of the cooler.

17. The method of claim 16, further comprising directing at least some of the cooled exhaust gas to an intake system of the engine.

18. The method of claim 16, further comprising directing cooling medium to the cooler for cooling the exhaust gas,
   measuring a temperature drop of the cooling medium across the cooler,
   measuring a temperature drop of the exhaust gas across the cooler, and
   determining the level of fouling of the cooler as a function of the temperature drop of the cooling medium across the cooler, the temperature drop of the exhaust gas across the cooler, and the pressure drop of the exhaust gas across the cooler.

19. The method of claim 17, further comprising controlling an engine condition as a function of the measured flowrate.

20. The method of claim 19, in which the engine condition comprises at least one of injection timing, recirculated exhaust gas flowrate, variable intake valve timing, turbocharger wastegating, and regeneration of a particulate filter.

21. The method of claim 19, in which the engine condition is controlling a recirculated exhaust gas flowrate and the flowrate is controlled by controlling the position of a recirculated exhaust gas flow valve.

22. The method of claim 16, further comprising a regeneration device configured to increase the temperature of an entire flow of the exhaust gas to a desired temperature.

23. The method of claim 16, further comprising an energy extraction assembly configured to extract energy from, and reduce the pressure of, the exhaust gas.

24. The method of claim 16, further comprising cooling a flow of exhaust gas with an aftercooler.

25. An exhaust system for receiving exhaust gas of an engine, comprising:
- a cooler configured to cool at least a portion of exhaust gas;
- a pressure sensor configured to measure an exhaust pressure drop across the cooler;
- a controller configured to determine exhaust flowrate as a function of the measured pressure drop across the cooler, the cooler comprising a cooling medium for cooling the exhaust gas;
- a first set of temperature sensors configured to measure the temperature drop of the cooling medium across the cooler;
- a second set of temperature sensors configured to measure the temperature drop of the exhaust gas across the cooler; and
- a controller configured to determine a level of fouling within the cooler as a function of the temperature drop of the cooling medium across the cooler, the temperature drop of the exhaust gas across the cooler, and the pressure drop of the exhaust gas across the cooler.

26. The exhaust system of claim 25, further comprising a regeneration device.

27. The exhaust system of claim 26, wherein the regeneration device is fluidly connected to an energy extraction assembly via a flow line and is configured to increase the temperature of the exhaust gas to a desired temperature.

28. The exhaust system of claim 25, further comprising an energy extraction assembly.

29. The exhaust system of claim 28, wherein the energy extraction assembly is configured to extract energy from, and reduce the pressure of, the exhaust gas.

30. The exhaust system of claim 25, further comprising an aftercooler.

31. The exhaust system of claim 30, wherein the aftercooler is fluidly connected to the engine via a flow line and is configured to cool a flow of exhaust gas passing through the flow line.

32. A method for operating an engine, comprising:
combusting a fuel and air mixture;
- exhausting at least some of the combusted fuel and air mixture as exhaust gas to an exhaust system of an engine;
- cooling at least some of the combusted exhaust gas in a cooler;
- measuring pressure drop of the exhaust gas across the cooler;
- determining a flowrate of the exhaust gas across the cooler as a function of pressure drop;
- measuring a temperature drop of the cooling medium across the cooler;
- measuring a temperature drop of the exhaust gas across the cooler; and
- determining a level of fouling of the cooler as a function of the temperature drop of the cooling medium across the cooler, the temperature drop of the exhaust gas across the cooler, and the pressure drop of the exhaust gas across the cooler.

33. The method of claim 32, further comprising increasing the temperature of an entire flow of exhaust gas produced by the engine to a desired temperature.

34. The method of claim 32, further comprising extracting energy from, and reducing the pressure of, the exhaust gas with an energy extraction assembly.

35. The method of claim 32, further comprising cooling a flow of exhaust gas with an aftercooler.

* * * * *